United States Patent [19]

Toy et al.

[11] Patent Number: 4,947,421
[45] Date of Patent: Aug. 7, 1990

[54] CALL WAITING ARRANGEMENT PROVIDING OPTIONS TO BOTH A SUBSEQUENT CALLING PARTY AND TO THE CALLED PARTY

[75] Inventors: Liane C. Toy; Wing N. Toy, both of Glen Ellyn, Ill.

[73] Assignee: AT&T Bell Laboratories, Murray Hill, N.J.

[21] Appl. No.: 137,040

[22] Filed: Dec. 23, 1987

[51] Int. Cl.$^5$ .............................................. H04M 3/50
[52] U.S. Cl. ...................................... 379/67; 379/215; 379/84; 379/77
[58] Field of Search ................... 379/67, 88, 199, 208, 379/209, 215, 373, 381, 210, 211, 142

[56] References Cited

U.S. PATENT DOCUMENTS

| | | | |
|---|---|---|---|
| 3,344,235 | 9/1967 | Green et al. | 379/208 |
| 3,517,139 | 6/1970 | Whitney . | |
| 3,889,068 | 6/1975 | Dellecker | 379/209 |
| 3,936,613 | 2/1976 | Nishigori et al. | 379/209 |
| 3,956,595 | 5/1976 | Sobanski . | |
| 4,582,956 | 4/1986 | Doughty | 379/142 |
| 4,661,975 | 4/1987 | Brecher | 379/215 |
| 4,802,206 | 1/1989 | Yoshida et al. | 379/215 |
| 4,809,321 | 2/1989 | Morganstein et al. | 379/210 |

FOREIGN PATENT DOCUMENTS 62-26963 2/1987 Japan .

OTHER PUBLICATIONS

"Bellcore Teaches Some Manners to Call Waiting", *Telephony*, Aug. 24, 1987, pp. 15, 16.
"Business and Residence Features", *Switching Products 5ESS® Switch Feature Handbook*, 235-390-500, 1986, pp. 14, 15.
Bell Laboratories Station User's Guide for the AT&T Dimension® PBX, Jun. 1982.
Nippon Denki K.K., "Additional Dial Call Waiting System", vol. 9, No. 165 (E-327) (1888), Jul. 10, 1985.

*Primary Examiner*—Steven L. Stephan
*Assistant Examiner*—James E. Tomassini
*Attorney, Agent, or Firm*—Ross T. Watland

[57] ABSTRACT

An improved call waiting arrangement where a caller is free to exercise discretion in interrupting ongoing telephone calls because the caller is prompted, for example via an audible announcement, that the called party is busy on another call but that the caller may request interruption of the call by remaining off-hook. If the caller believes that his call is sufficiently important, he requests call interruption by remaining off-hook. If the caller chooses not to interrupt, he may make subsequent call attempts promptly because he knows that the called party is busy on another call rather than being away from home. Alternatively, the caller may activate autocallback such that a call is completed between the two parties as soon as the status of the called station returns to on-hook.

11 Claims, 5 Drawing Sheets

4,947,421

CALL WAITING ARRANGEMENT PROVIDING OPTIONS TO BOTH A SUBSEQUENT CALLING PARTY AND TO THE CALLED PARTY

TECHNICAL FIELD

This invention relates to telecommunication call processing.

BACKGROUND AND PROBLEM

As stored program-controlled switching systems have evolved, a wide variety of useful features have been developed to extend the communication capabilities such systems provide. Call waiting, a feature that uses a beep tone to inform a customer already engaged in an ongoing telephone conversation that a second call is coming in, is considered a convenience in many circumstances, allowing, for example, the interruption of an extended but relatively unimportant call to take an emergency, or long-awaited, priority call. However, there are several problems with the call waiting feature. Many customers would prefer not to have their telephone conversations interrupted, particularly by frequent routine or unwanted calls; customers with call waiting tend to interrupt a call to find out who is making a second call. If a customer with call waiting chooses to leave a second call unanswered, the second caller hears ringing and is unaware that the called party is busy on the telephone. The second caller may unnecessarily defer a subsequent call attempt based on the mistaken impression that the called party is not at home. Further, a call waiting interruption of a computer terminal data communication session is particularly undesirable. A customer may deactivate call waiting for such data sessions, but undesirably loses the benefit of call waiting interruption for important incoming calls for the duration of each, typically lengthy, data session.

In view of the foregoing, a recognized problem in the art is the failure of existing call waiting features to inform calling parties of the true call state at the called station so that unnecessary call interruptions and call attempt deferrals are minimized.

SOLUTION

The foregoing problem is solved and a technical advance is achieved in accordance with the principles of the invention in an exemplary, improved call waiting arrangement where a caller is free to exercise discretion in interrupting ongoing telephone calls because the caller is prompted, for example via an audible announcement, that the called party is busy on another call but that the caller may request interruption of the call by remaining off-hook. If the caller believes that his call is sufficiently important, he requests call interruption by remaining off-hook. If the caller chooses not to interrupt, he may make subsequent call attempts promptly, because he knows that the called party is busy on another call rather than being away from home. Alternatively, the caller may activate auto-callback such that a call is completed between the two parties as soon as the status of the called station returns to on-hook.

In accordance with the invention, a call from a calling communication station to a called communication station is processed by determining whether call waiting is assigned to the called station and the called station is busy. If it is determined that call waiting is assigned to the called station and the called station is busy, signaling is performed to inform a caller at the calling station of the busy status of the called station.

In an exemplary switching arrangement described herein, the signaling comprises an audible announcement comprising a recording of the voice of a customer expected to answer calls to the called station. The announcement prompts the caller that he may request interruption of an ongoing call by remaining off-hook or he may request auto-callback. The switching arrangement responds to an interrupt request by determining whether the call is a toll call. If the call is a toll call, an interrupt tone is transmitted to the called station that is distinctive from an interrupt tone for a local call. The switching arrangement responds to an auto-callback request and to a return to an idle status of the called station by completing a call between the called and the calling stations.

DRAWING DESCRIPTION

Figure 1:
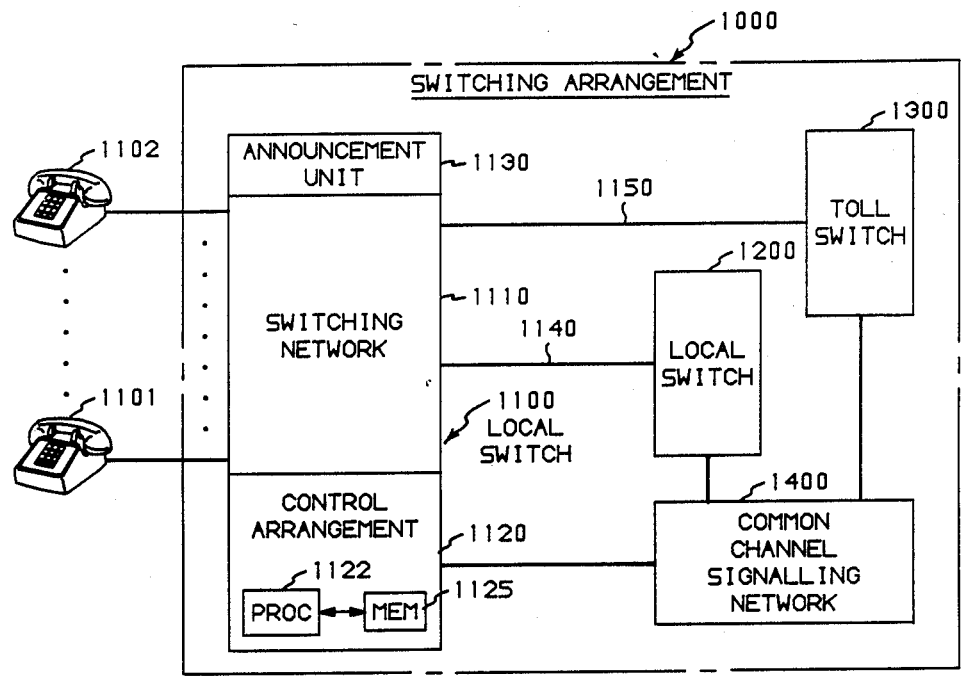
FIG. 1 is a diagram of a switching arrangement implementing an exemplary, improved call waiting feature in accordance with the present invention.
Figure 3:
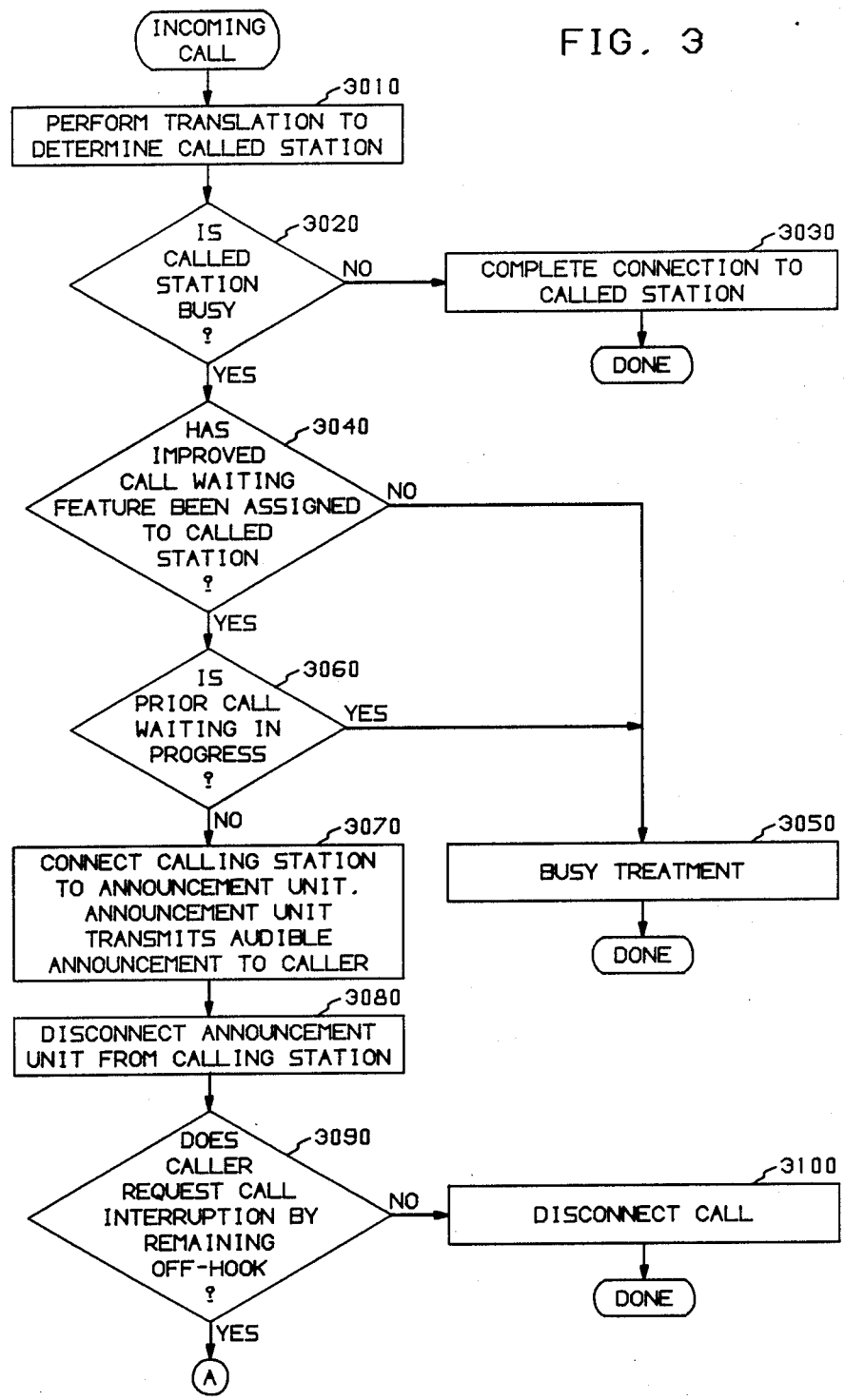
Figure 4:
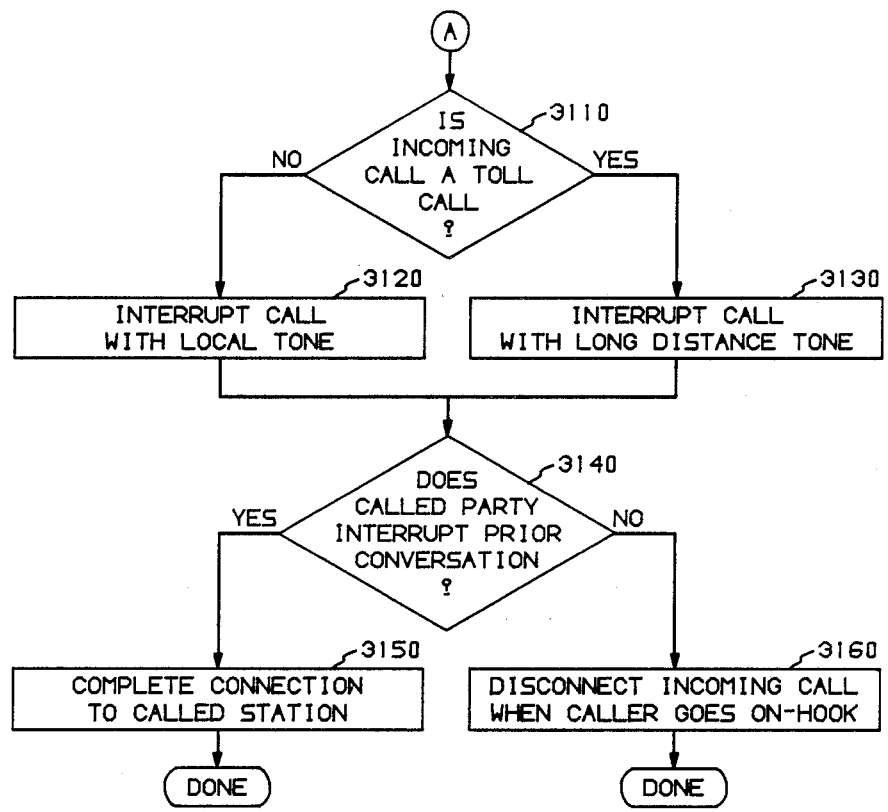
Figure 5:
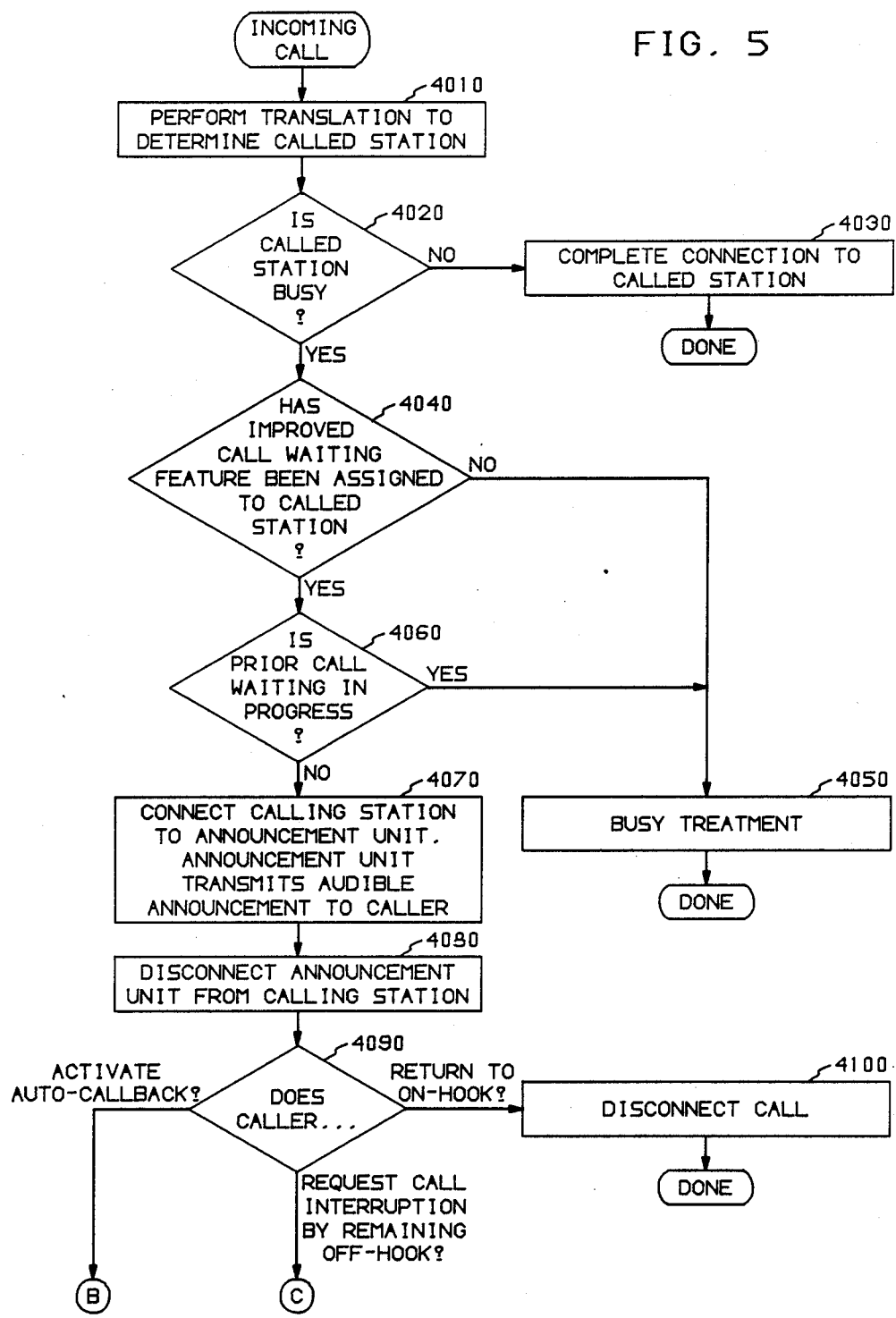
Figure 6:
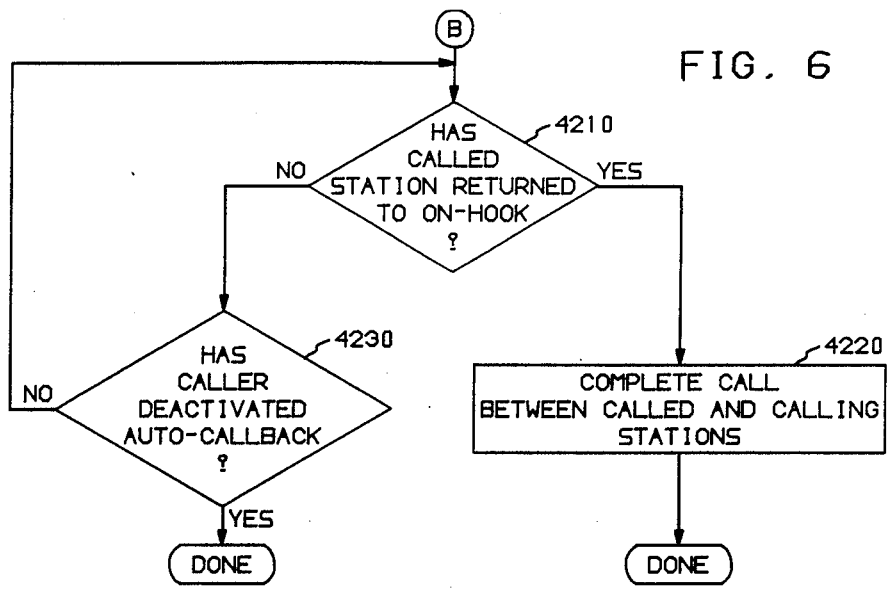
Figure 7:
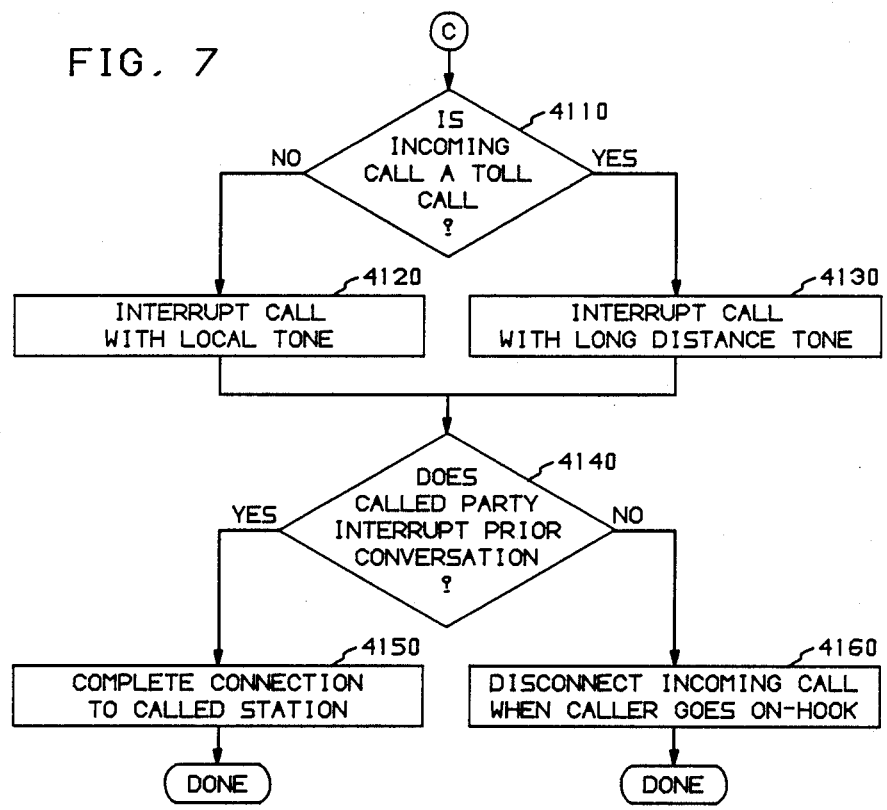

FIGS. 3 and 4 comprise a flow chart for a program used to effect call waiting in the arrangement of FIG. 1; and FIGS. 5, 6 and 7 comprise a flow chart for an alternative call waiting program.

DETAILED DESCRIPTION

In FIG. 1, switching arrangement 1000 includes local switches 1100 and 1200, toll switch 1300 and common channel signaling network 1400. An example of local switch 1100 or 1200 is disclosed in U.S. Pat. No. 3,570,008 issued to R. W. Downing, et al., on Mar. 9, 1971, and *The Bell System Technical Journal*, Vol. 43, No. 5, Parts 1 and 2 of Sept., 1964. An example of toll switch 1300 is disclosed in U.S. Pat. No. 3,736,381 issued to G. D. Johnson, et al., on May 29, 1973. Switches 1100, 1200, and 1300 are connected together and to other switches via a common channel signaling network 1400 such as that described in *The Bell System Technical Journal*, Vol. 57, No. 2 of Feb., 1978. Network 1400 provides high-speed data transmission between the control facilities of switches 1100, 1200 and 1300 to carry all signaling, address, and network control information independently of the inter-switch talking paths. For instance, this information includes the identity of trunks used by customers as well as calling and called party identification.

Figure 2:
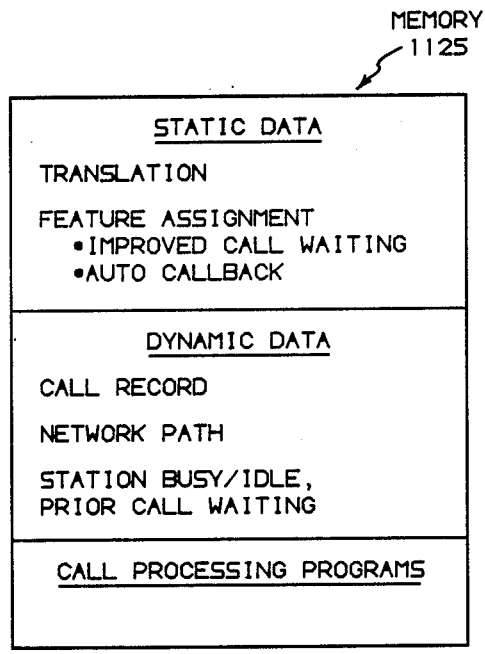
FIG. 2 is a memory map for memory facilities included in a control portion of the switching arrangement of FIG. 1.

Local switch 1100 includes a switching network 1110 interconnecting a plurality of analog station sets such as 1101 and 1102 under the control of a control arrangement 1120 including a processor 1122 and associated memory 1125. Memory 1125 (FIG. 2) includes storage for static and dynamic data as well as the call processing programs used to control the operation of switch 1100. Also specifically shown is announcement unit 1130 which is used in accordance with the present invention to play advisory announcements to callers at analog stations sets 1101 and 1102, or to callers connected via local switch 1200 or toll switch 1300.

A flow chart for a call processing program stored in memory 1125 and executed by processor 1122 to implement an illustrative, improved call waiting arrangement in accordance with the invention is shown in FIGS. 3 and 4. Execution of the program is initiated either in response to a call origination from a station on switch 1100 or in response to receipt of a message from another switch concerning an incoming inter-switch call. Execution begins with block 3010 where translation data is read from the static data section of memory 1125 to determine the identity of the called station based on the address information provided by the caller. Once the called station has been determined, execution proceeds to decision block 3020 where the station busy/idle data is read from the dynamic data section of memory 1125 to determine whether the called station is busy. If the check indicates that the called station is not busy, execution proceeds from block 3020 to block 3030 where a connection is completed to the called station. However, if the check made in block 3020 indicates that the called station is busy, execution proceeds from block 3020 to decision block 3040 where the feature assignment data is read from the static data section of memory 1125 to determine whether the improved call waiting feature has been assigned to the called station. If the check indicates that the called station has not been assigned the improved call waiting feature, execution proceeds from block 3040 to block 3050 where busy treatment is provided to the caller. However, if the check made in block 3040 indicates that the called station has been assigned the improved call waiting feature, execution proceeds from block 3040 to block 3060 where the prior call waiting data is read from the dynamic data section of memory 1125 to determine whether a prior call waiting call is in progress at the called station. If the check indicates that a prior call waiting call is in progress, execution proceeds from block 3060 to block 3050 where busy treatment is provided to the caller. However, if the check made in block 3060 indicates that there is no prior call waiting call in progress at the called station, execution proceeds from decision block 3060 to block 3070 where the calling station is connected to announcement unit 1130. Announcement unit 1130 transmits an audible announcement to the caller, for example, a recording of the voice of a customer expected to answer calls to the called station. The announcement informs the caller of the busy status of the called station. The announcement also prompts the caller indicating that the caller may request interruption of an ongoing call at the called station by maintaining an off-hook state of the calling station. Once the announcement has been completed, execution proceeds from block 3070 to block 3080 and announcement unit 1130 is disconnected from the calling station. Execution then proceeds to decision block 3090 where the line connected to the calling station is monitored to determine whether the caller requests call interruption by remaining off-hook for more than a predetermined time, e.g., 10 seconds. If the caller does not remain off-hook for more than the predetermined time, execution proceeds from block 3090 to block 3100 where the call is disconnected. However, if the caller remains off-hook for more than the predetermined time, execution proceeds from block 3090 to decision block 3110 where the call record data stored in the dynamic data section of memory 1125 is read to determine whether the incoming call is a toll call. If the check indicates that the call is a toll call, execution proceeds from block 3110 to block 3130 where an interrupt tone is transmitted to the called station that is distinctive from an interrupt tone for a local call. If the check indicates that the call is not a toll call, execution proceeds from block 3110 to block 3120 where an interrupt tone for a local call is transmitted to the called station. Execution proceeds from either of the blocks 3120 or 3130 to a decision block 3140 where the line to the called station is monitored to determine whether the called party interrupts the ongoing conversation to take the incoming call by the appropriate station signaling procedure for such interruption. If the caller does not interrupt, execution proceeds from block 3140 to block 3160 where the incoming call is thereafter disconnected when the caller goes on-hook. However, if the caller does interrupt, execution proceeds from block 3140 to block 3150 and a connection is completed between the calling and called stations. The parties can now communicate.

A flow chart for a call processing program stored in memory 1125 and executed by processor 1122 to implement an alternative, improved call waiting arrangement in accordance with the invention is shown in FIGS. 5, 6 and 7. Execution of the program is initiated either in response to a call origination from a station on switch 1100 or in response to receipt of a message from another switch concerning an incoming inter-switch call. Execution begins with block 4010 where translation data is read from the static data section of memory 1125 to determine the identity of the called station based on the address information provided by the caller. Once the called station has been determined, execution proceeds to decision block 4020 where the station busy/idle data is read from the dynamic data section of memory 1125 to determine whether the called station is busy. If the check indicates that the called station is not busy, execution proceeds from block 4020 to block 4030 where a connection is completed to the called station. However, if the check made in block 4020 indicates that the called station is busy, execution proceeds from block 4020 to decision block 4040 where the feature assignment data is read from the static data section of memory 1125 to determine whether the improved call waiting feature has been assigned to the called station. If the check indicates that the called station has not been assigned the improved call waiting feature, execution proceeds from block 4040 to block 4050 where busy treatment is provided to the caller. However, if the check made in block 4040 indicates that the called station has been assigned the improved call waiting feature, execution proceeds from block 4040 to block 4060 where the prior call waiting data is read from the dynamic data section of memory 1125 to determine whether a prior call waiting call is in progress at the called station. If the check indicates that a prior call waiting call is in progress, execution proceeds from block 4060 to block 4050 where busy treatment is provided to the caller. However, if the check made in block 4060 indicates that there is no prior call waiting call in progress at the called station, execution proceeds from decision block 4060 to block 4070 where the calling station is connected to announcement unit 1130. Announcement unit 1130 transmits an audible announcement to the caller, for example, a recording of the voice of a customer expected to answer calls to the called station. The announcement informs the caller of the busy status of the called station. The announcement also prompts the caller indicating that the caller may request interruption of an ongoing call at the called station by maintaining an off-hook state of the calling station or may activate an auto-call back feature is such feature is assigned to the calling station. Once the announcement has been completed, execution proceeds from block 4070 to block 4080 and announcement unit 1130 is disconnected from the calling station. Execution then proceeds to branch block 4090 where the line connected to the calling station is monitored to determine which of three events occurs: (1) the caller returns the calling station to an on-hook status within a predetermined time, e.g., 10 seconds, (2) the caller activates auto-call back using the appropriate station set signaling procedure, or (3) the caller requests call interruption by remaining off-hook for more than the predetermined time. If the caller does not remain off-hook for more than the predetermined time, execution proceeds from block 4090 to block 4100 where the call is disconnected. If the caller remains off-hook for more than the predetermined time, execution proceeds from block 4090 to decision block 4110 (FIG. 7) where the call record data stored in the dynamic data section of memory 1125 is read to determine whether the incoming call is a toll call. If the check indicates that the call is a toll call, execution proceeds from block 4110 to block 4130 where an interrupt tone is transmitted to the called station that is distinctive from an interrupt tone for a local call. If the check indicates that the call is not a toll call, execution proceeds from block 4110 to block 4120 where an interrupt tone for a local call is transmitted to the called station. Execution proceeds from either of the blocks 4120 or 4130 to a decision block 4140 where the line to the called station is monitored to determine whether the called party interrupts the ongoing conversation to take the incoming call by the appropriate station signaling procedure for such interruption. If the caller does not interrupt, execution proceeds from block 4140 to block 4160 where the incoming call is thereafter disconnected when the caller goes on-hook. However, if the caller does interrupt, execution proceeds from block 4140 to block 4150 and a connection is completed between the calling and called stations. The parties can now communicate.

Returning to branch block 4090 (FIG. 5), if the caller activates auto-callback, execution proceeds instead to block 4210 (FIG. 6) where the line to the called station is checked to determine whether the called station has been returned to an on-hook status. If the check indicates that the called station has not been returned to on-hook status, execution proceeds from block 4210 to decision block 4230 where a check is made to determine whether the caller has subsequently deactivated the auto-callback feature. If the auto-callback feature has been deactivated, processing of the call is completed. However, if the auto-callback feature remains active, execution is returned from block 4230 back to block 4210. Once a check made in block 4210 indicates that the called station has been returned to on-hook status, execution proceeds from block 4210 to block 4220 and a call is completed between the called and calling stations. The two parties can now communicate.

It is to be understood that the above-described call waiting arrangements are merely illustrative of the principles of the present invention and that many variations may be devised by those skilled in the art without departing from the spirit and scope of the invention. It is therefore intended that such variations be included within the scope of the claims.

What is claimed is:

1. A method of processing a call from a calling communication station to a called communication station comprising in response to said call, determining whether call waiting is assigned to said called station and said called station is busy, in response to a determination that call waiting is assigned to said called station and said called station is busy, signaling to prompt a caller for a request to interrupt an ongoing call at said called station and to prompt a caller for an auto-callback request, in response to receipt of an interrupt request from said calling station, transmitting an interrupt signal to said called station, after said transmitting, establishing a connection between said calling and called stations only in response to receipt of a signal from said called station, and in response to receipt of an auto-callback request from said calling station and to a return to an idle status of said called station, initiating a new call between said called and calling stations.

2. A method in accordance with claim 1 wherein said signaling step comprises transmitting a message to said calling station.

3. A method in accordance with claim 2 wherein said message comprises an audible announcement transmitted to said caller.

4. A method in accordance with claim 3 wherein said announcement prompts said caller at said calling station that said caller may request interruption of an ongoing call at said called station by maintaining an off-hook state of said calling station.

5. A method in accordance with claim 4 wherein said announcement comprises a recording of the voice of a customer expected to answer calls to said called station.

6. A method in accordance with claim 1 further comprising in response to receipt of signaling from said calling station representing an on-hook state of said calling station, discontinuing processing of said first mentioned call.

7. A method in accordance with claim 1 wherein said interrupt request comprises signaling representing an off-hook state of said calling station.

8. A method in accordance with claim 1 wherein said interrupt request comprises signaling representing a continued off-hook state of said calling station for more than a predetermined time.

9. A method in accordance with claim 1 wherein said interrupt signal comprises a call waiting tone.

10. A method in accordance with claim 1 further comprising in response to receipt of said interrupt request from said calling station, determining whether said first-mentioned call is a toll call, in response to a determination that said first-mentioned call is a toll call, transmitting an interrupt tone to said called station that is distinctive from an interrupt tone for a local call.

11. A switching arrangement for processing calls among a plurality of communication stations, said arrangement comprising means, responsive to a call from a calling one of said stations to a called one of said stations, for determining whether call waiting is assigned to said called station and said called station is busy, means, responsive to a determination by said determining means that call waiting is assigned to said called station and said called station is busy, for signaling to prompt a caller for a request to interrupt an ongoing call at said called station and to prompt a caller for an auto-callback request, means, responsive to receipt of an interrupt request from said calling station, for transmitting an interrupt signal to said called station, means for establishing a connection between said calling and called stations only in response to receipt of a signal from said called station after transmission of said interrupt signal by said transmitting means, and means responsive to receipt of an auto-callback request from said calling station and to a return to an idle status of said called station, for initiating a new call between said called and calling stations.

* * * * *